(12) United States Patent
Kondoh et al.

(10) Patent No.: US 10,248,241 B2
(45) Date of Patent: Apr. 2, 2019

(54) DIGITAL SIGNAGE SYSTEM

(71) Applicants: Tsuneaki Kondoh, Kanagawa (JP);
Tomoaki Sugawara, Kanagawa (JP);
Yuko Arizumi, Kanagawa (JP);
Junichiro Natori, Kanagawa (JP);
Mizuki Otagiri, Kanagawa (JP);
Takahiro Imai, Tokyo (JP)

(72) Inventors: Tsuneaki Kondoh, Kanagawa (JP);
Tomoaki Sugawara, Kanagawa (JP);
Yuko Arizumi, Kanagawa (JP);
Junichiro Natori, Kanagawa (JP);
Mizuki Otagiri, Kanagawa (JP);
Takahiro Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 15/097,494

(22) Filed: Apr. 13, 2016

(65) Prior Publication Data
US 2016/0328066 A1 Nov. 10, 2016

(30) Foreign Application Priority Data

May 7, 2015 (JP) ................................ 2015-095079
Jan. 26, 2016 (JP) ................................ 2016-012259

(51) Int. Cl.
*G09F 7/00* (2006.01)
*G06F 3/041* (2006.01)
(Continued)

(52) U.S. Cl.
CPC .............. *G06F 3/0414* (2013.01); *G06T 3/20* (2013.01); *G09F 7/00* (2013.01); *G09F 19/228* (2013.01); *G09F 9/30* (2013.01); *G09F 19/18* (2013.01); *G09F 27/005* (2013.01); *G09F 2007/005* (2013.01)

(58) Field of Classification Search
None
See application file for complete search history.

(56) References Cited

U.S. PATENT DOCUMENTS 3,739,644 A * 6/1973 Underwood .......... G01L 9/0054
338/4
3,916,401 A * 10/1975 Freeman .................. G08B 7/06
340/326

(Continued)

FOREIGN PATENT DOCUMENTS

EP 0669758 8/1995
EP 1919072 A1 * 5/2008 ............... B32B 3/30
(Continued)

OTHER PUBLICATIONS

Extended European Search Report dated Sep. 7, 2016.
Office Action dated Mar. 9, 2018 issued with respect to the corresponding European Patent Application No. 16167071.6.

*Primary Examiner* — Dorothy Harris
(74) *Attorney, Agent, or Firm* — IPUSA, PLLC

(57) ABSTRACT

A digital signage system includes a transducer configured to transform a pressure to an electrical signal; a control apparatus configured to change information in association with the intensity of the electrical signal; and an output apparatus configured to output the information to an output target based on a command of the control apparatus.

6 Claims, 12 Drawing Sheets

(51) Int. Cl.
    *G09F 19/22*     (2006.01)
    *G06T 3/20*     (2006.01)
    *G09F 27/00*     (2006.01)
    *G09F 9/30*     (2006.01)
    *G09F 19/18*     (2006.01)

(56) References Cited

U.S. PATENT DOCUMENTS

| | | | |
|---|---|---|---|
| 4,250,415 A | 2/1981 | Lewiner et al. | |
| 4,576,244 A | 3/1986 | Zeigner et al. | |
| 4,888,581 A * | 12/1989 | Guscott | G08B 21/043 200/61.93 |
| 5,848,830 A * | 12/1998 | Castle | A47G 27/0243 362/253 |
| 2006/0242867 A1* | 11/2006 | Choi | G09F 13/12 40/219 |
| 2008/0048880 A1* | 2/2008 | Strickland | G06F 3/041 340/815.4 |
| 2011/0234493 A1 | 9/2011 | Kravits et al. | |
| 2012/0073388 A1* | 3/2012 | Chibante | G01L 1/20 73/862.627 |
| 2012/0086659 A1* | 4/2012 | Perlin | G06F 3/005 345/173 |
| 2012/0309531 A1* | 12/2012 | Gong | H03K 17/955 463/36 |
| 2013/0113057 A1* | 5/2013 | Taylor | G01L 1/18 257/417 |
| 2015/0177079 A1* | 6/2015 | Eichhorn | G01L 9/0054 73/774 |
| 2015/0237293 A1* | 8/2015 | Fukuda | H04N 5/7458 348/745 |
| 2015/0248083 A1 | 9/2015 | Kondoh et al. | |
| 2015/0252821 A1 | 9/2015 | Sugawara et al. | |

FOREIGN PATENT DOCUMENTS

| | | | |
|---|---|---|---|
| JP | S54-014696 | 2/1979 | |
| JP | 2000-056917 | 2/2000 | |
| JP | 3526897 | 5/2004 | |
| JP | 2005-157135 | 6/2005 | |
| JP | 2009-253050 | 10/2009 | |
| JP | 2014-026040 | 2/2014 | |
| JP | 2014-027756 | 2/2014 | |
| WO | 2006/020637 | 2/2006 | |
| WO | 2014/017184 | 1/2014 | |
| WO | WO-2014105970 A1 * | 7/2014 | B32B 27/283 |

* cited by examiner

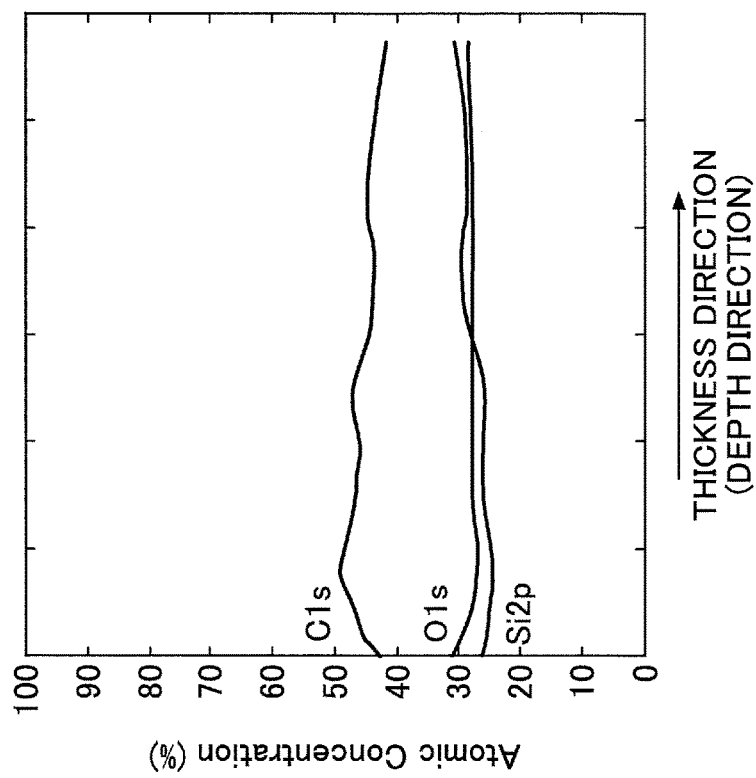
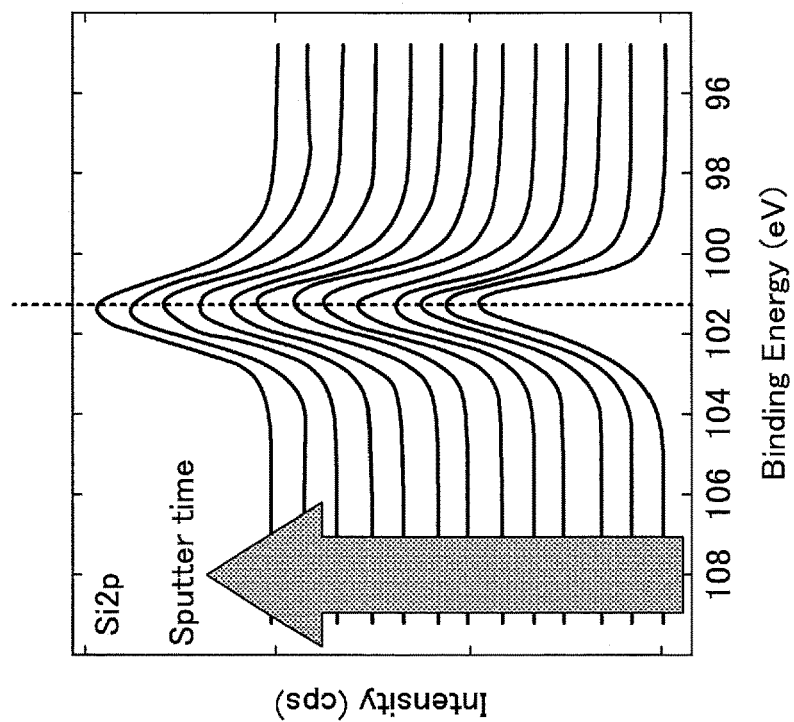

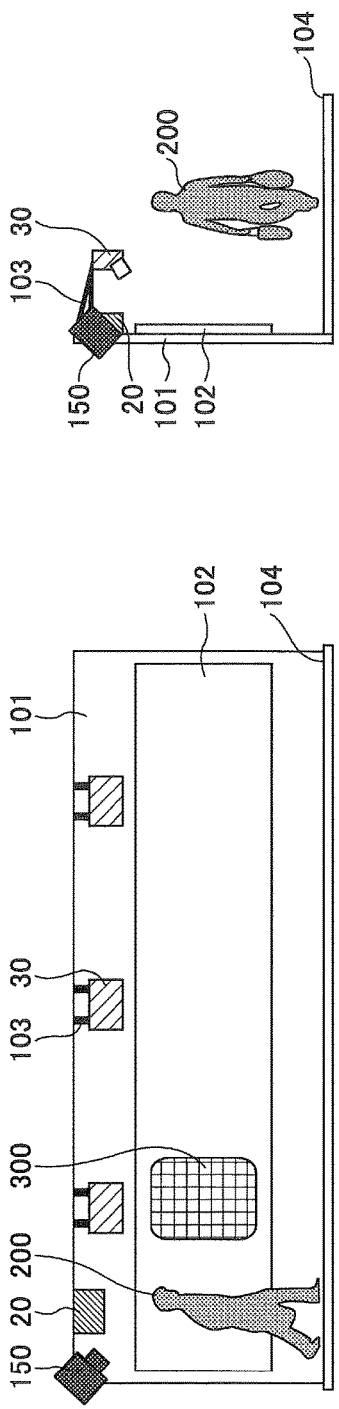
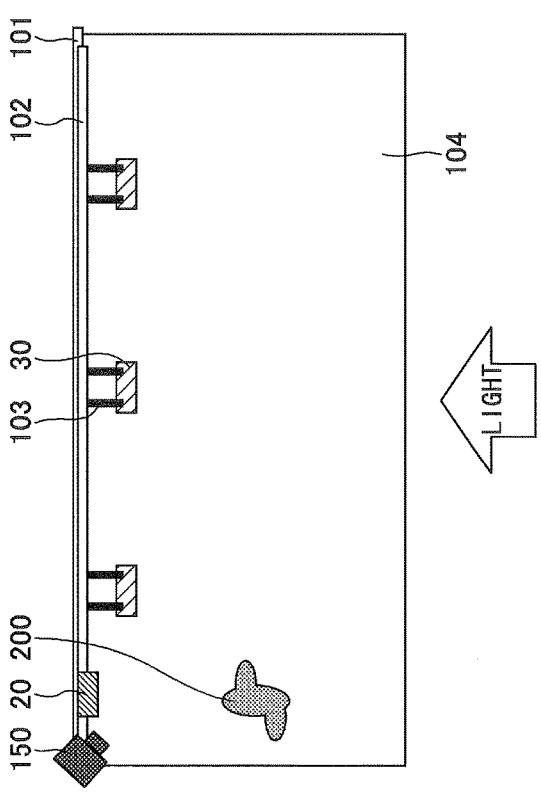
FIG.12A RELATED ART
FIG.12B RELATED ART
FIG.12C RELATED ART

DIGITAL SIGNAGE SYSTEM

BACKGROUND OF THE INVENTION

1. Field of the Invention

The present invention relates to a digital signage system.

2. Description of the Related Art

In recent years, a digital signage system is in widespread use as one means for an advertisement. This system advertises an advertisement image in a digital signage provided in a shop, a station, or a public space. Thus, the system advertises to a great number of users. The advertisement image may be either a moving image or a still image. The advertisement image has a greater information amount than that of a paper medium, and is frequently displayed by appropriately switching over at a constant time period. Therefore, viewing time is required to be extended in order to enhance customer appeal.

In relation thereto, for example, there is proposed a technique of enhancing an advertising effect by disabling a part of information displayed on a digital signage when a user notices an existence of the digital signage (for example, Patent Document 1).

Further, if a person moves in front of a screen, there is proposed a technique of effectively providing information and enhancing the visibility by dynamically changing an output position of a window and a content to be output on the screen in conformity with a natural motion of the person. For example, a window moves in conformity with the motion of the person in front of the screen.

According to this technique, a position detection means determines a coordinate on a screen on which information is output after providing a coordinate conversion to the position of the person and a finger pointing direction, which are detected from an image captured by a camera (for example, Patent Document 2).

There is also proposed a technique of three-dimensionally detecting the position using combined multiple cameras and reflecting to the image (for example, Patent Document 3).

Patent Document 1: Japanese Laid-Open Patent Publication No. 2014-026040
Patent Document 2: Japanese Laid-Open Patent Publication No. 2000-056917
Patent Document 3: Japanese Patent No. 3526897

SUMMARY OF THE INVENTION

However, according to the above techniques, the cameras are used. It is not possible to sufficiently improve the visibility of a pedestrian by such systems using the cameras.

The first reason is a complicated and heavy process, in which a color or a contour is extracted from an image and differences are obtained from the immediately former frame and the immediately latter frame.

The second reason is an insufficient data acquisition caused by a late data acquisition in a case where a process time is limited and a quick motion such as a running person is captured. In this case, if the frame rate is increased, the data acquisition becomes sufficient. However, because the increase of the frame rate causes an excessive increase of the process data and a further heavy system, the increase of the frame rate is not preferable.

The third reason is a necessity of a minute adjustment and a limited location, with which an optical environment variation such as a strong light or rain is prevented from occurring, to avoid influences of an ambient brightness and a color change.

The fourth reason is a dead angle occurring in cases where multiple persons pass or where a passage having a complicated shape, a pole, or the like exist.

Accordingly, it is a general object of the present invention to provide a novel and useful digital signage system with an improved visibility.

One aspect of the embodiments of the present invention may be to provide a digital signage system including a transducer configured to transform a pressure to an electrical signal; a control apparatus configured to change information in association with the intensity of the electrical signal; and an output apparatus configured to output the information to an output target based on a command of the control apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIGS. 10A and 10B illustrate exemplary measurement data of an intermediate layer which is not provided with the surface modification process and the inactivation process.

FIGS. 12A, 12B, and 12C illustrate a comparative example.

DETAILED DESCRIPTION OF THE PREFERRED EMBODIMENTS

A description is given below, with reference to the FIG. 1 through FIG. 12C of embodiments of the present invention. Where the same reference symbols are attached to the same parts, repeated description of the parts may be omitted.

Reference symbols typically designate as follows:
1: digital signage system;
10: detection sensor;
11: intermediate layer;
12: first electrode;
13: second electrode;
14: coil spring;
15, 17: support pedestal;
16: leaf spring;

20: control apparatus; and

30: projection apparatus.

Figure 1:
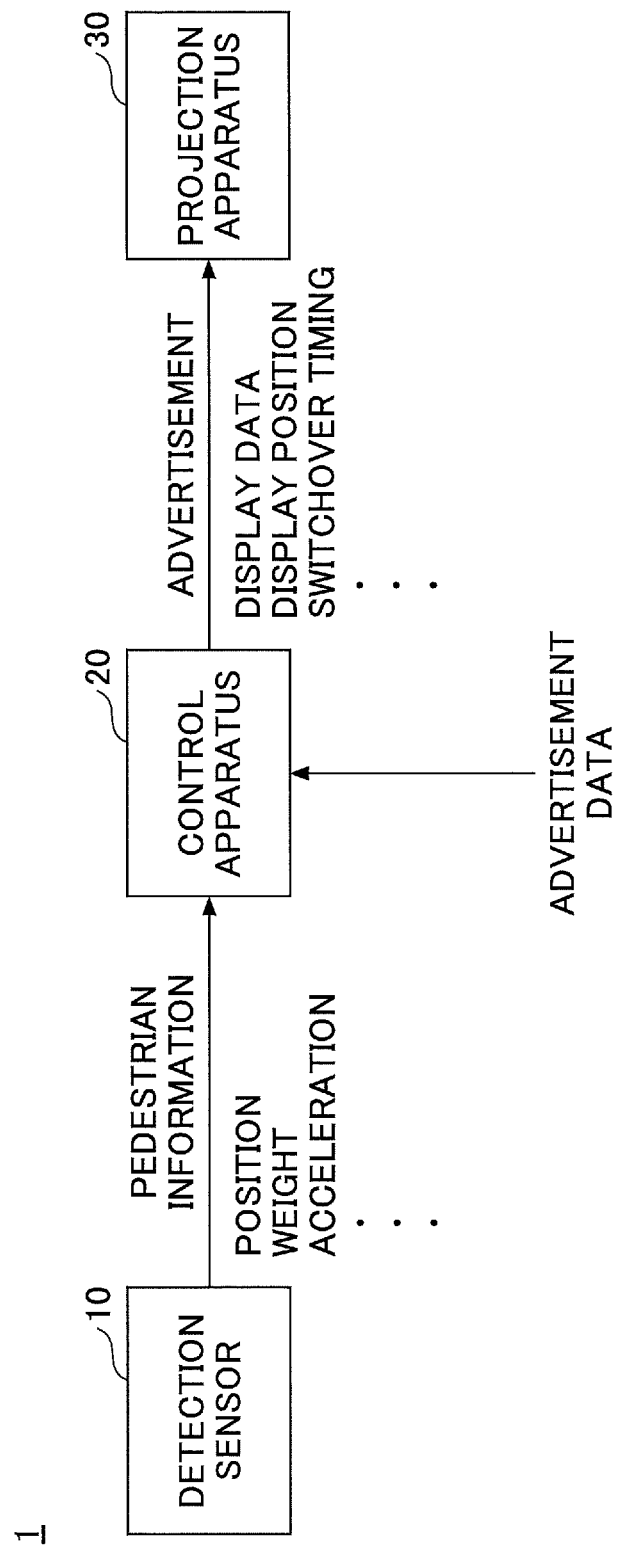
FIG. 1 illustrates a digital signage system of an embodiment.

FIG. 1 illustrates a digital signage system of an embodiment. In the digital signage system 1, pedestrian information sent from a detection sensor 10 is input into a control apparatus 20, and an image of an advertisement or the like is projected onto a projection face by a projection apparatus 30 upon a command from the control apparatus 20. Further, information can be changed in association with a signal intensity of the detection sensor 10.

A transducer converting a pressure to an electrical signal is used as the detection sensor 10. A specific example of the transducer is an electric generating element using a front and back hardness difference of an elastic body or the like. Further, a piezoelectric material, in which polarization is eccentrically located and fixed, a friction electric generating element using peeling electrification due to a difference in triboelectric series, and an electret electric generating element using an electret material previously provided with an energy deposition process may be used.

The control apparatus 20 may be structured to include a central processing unit (CPU), a read only memory (ROM), and a main memory, for example. In this case, various functions of the control apparatus 20 are substantialized such that a program stored in the ROM or the like is read out to the main memory and executed by the CPU. However, a part or all of the control apparatuses 20 may be substantialized only by hardware. The control apparatus 20 may be physically formed by multiple apparatuses. The control apparatus 20 is, for example, a personal computer.

In the control apparatus 20, software performing an algorithm for processing data is operated to process how to display a previously prepared advertisement data and a previously prepared program (a display position, a switchover timing, or the like) and to send a command to the projection apparatus 30.

The projection apparatus 30 is, for example, a projector, a liquid crystal display TV, a plasma display TV, an image display apparatus which can change a color for each element, or the like. The projection apparatus 30 may project information such as an advertisement on a projection face (a screen). However, as described later, a place where the information is projected may be an object other than the projection face (the screen).

The algorithm for processing the data can convert a voltage waveform at a contact position input from, for example, the detection sensor 10 to position information. Further, the algorithm for processing the data can predict the state of a body, a characteristic of walking, the sex, the age, and so on and can perform a selection of display data to the projection apparatus 30, a change of the switchover timing, a height adjustment of the display position, or the like, by analyzing, patterning, and combining the additional information.

Figure 2:
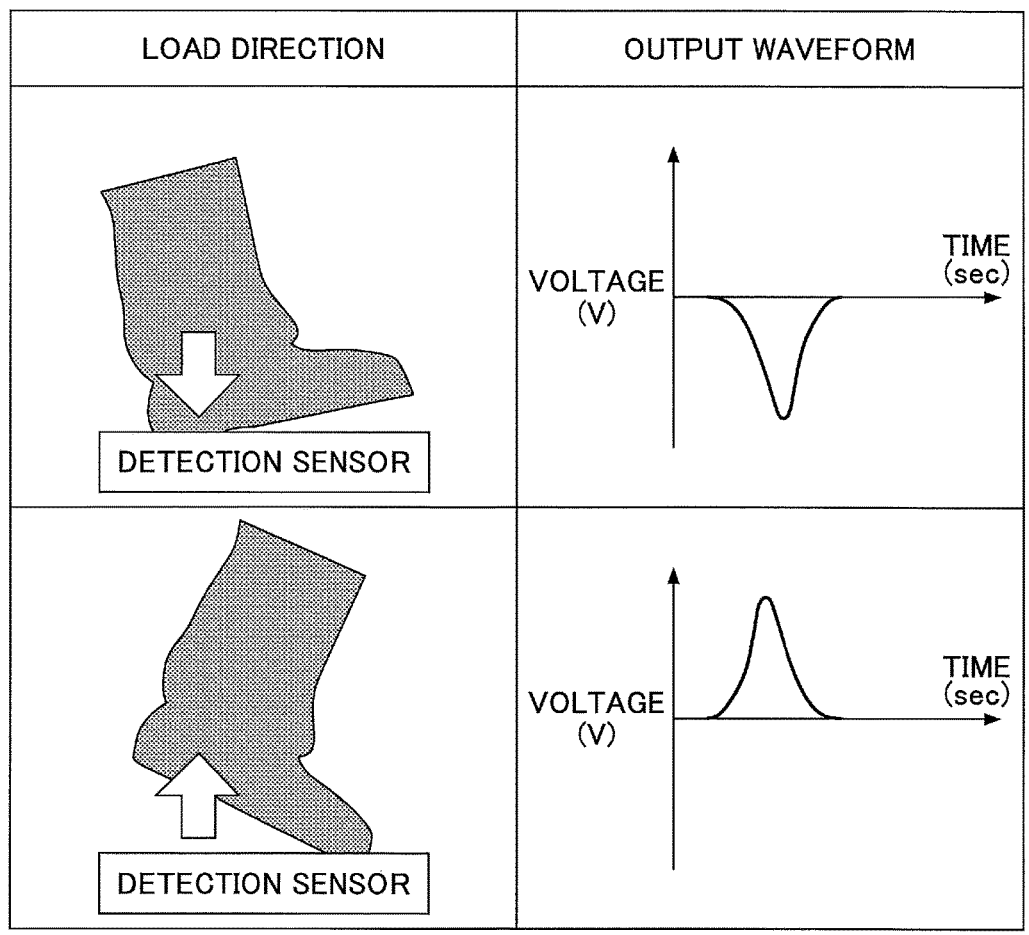
FIG. 2 illustrates exemplary additional information sent from a detection sensor.

The additional information is, for example, the acceleration, the weight, the weight shift, the size of foot of the pedestrian, and so on, which correspond to a gradient of a rise in the voltage waveform at the contact position input from the detection sensor 10. Alternatively, as illustrated in FIG. 2, the additional information may be features of electrical signals of output waveforms in cases where the load directions are pressurizing and depressurizing directions relative to the detection sensor.

The information to be changed is the image in this embodiment and the embodiment described below. However, the information to be changed is not limited to the image and may be a voice, an ultrasonic sound wave, or an electromagnetic wave. The previously prepared advertisement data may be previously recorded inside the control apparatus 20, may be appropriately input as the data and the program recorded in the recording medium, or may be downloaded as a program or data similar thereto from a network. At this time, the control apparatus 20 may be connected to the network by either a wired or wireless connection.

Figure 3C:
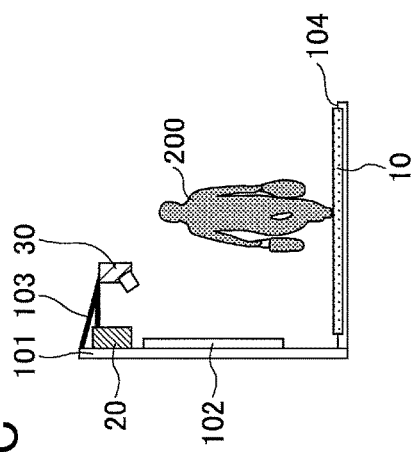
FIGS. 3A, 3B, and 3C illustrate an exemplary digital signage system of the embodiment.
Figure 3A:
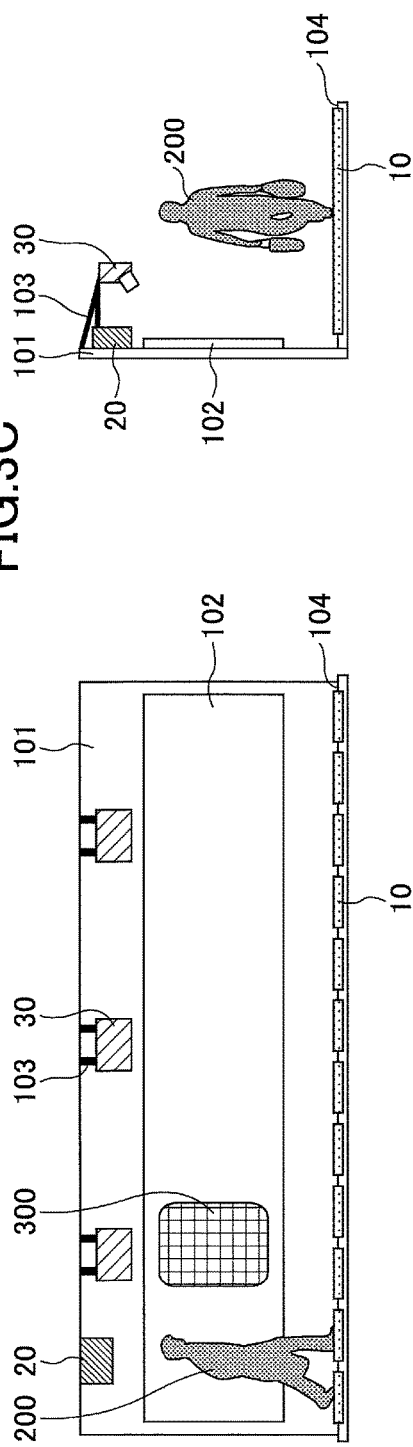
Figure 3B:
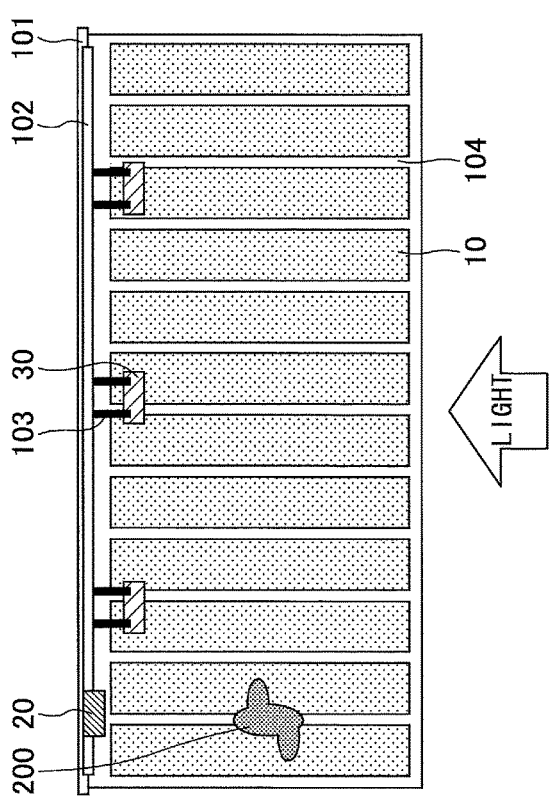

Next, referring to FIG. 3, the digital signage system 1 is described further in detail. FIGS. 3A, 3B, and 3C illustrate an exemplary digital signage system of the embodiment. FIG. 3A is a front view, FIG. 3B is a plan view, and FIG. 3C is side view.

Referring to FIGS. 3A-3C, a projection face (a screen) 102 is installed in a wall 101 at a position where a pedestrian 200 can view. The control apparatus 20 is installed above the pedestrian 200 and on the wall 101. Further, the multiple projection apparatuses 30 are supported by brace members 103 at a predetermined interval. A plurality of transducers are arranged on a floor 104 at a predetermined interval as the detection sensor 10.

When the pedestrian 200 walks on the floor 104, the detection sensor 10 installed in the floor 104 detects a motion of the pedestrian 200, pedestrian information received from the detection sensor 10 is input in the control apparatus 20, and the projection apparatus 30 projects an image 300 onto the projection face 102 upon a receipt of the command from the control apparatus 20. The image 300 can be displayed in association with the motion of the pedestrian 200 so that the image 300 is displayed at a diagonally forward position of the pedestrian 2 for a long time. The image 300 is, for example, an advertisement.

Figure 4A:
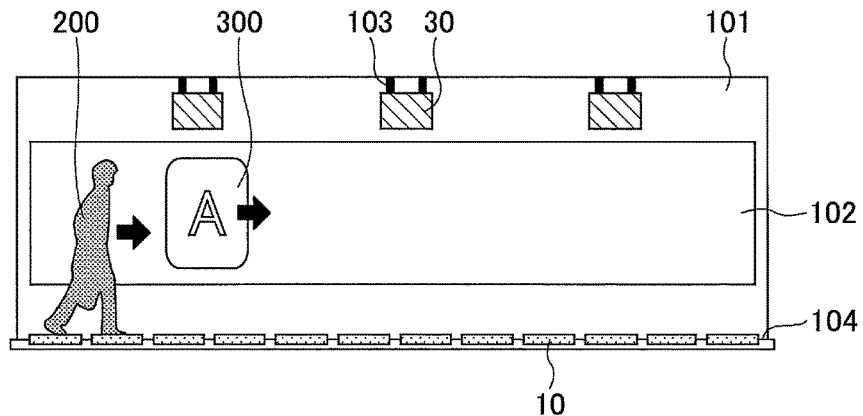
FIGS. 4A, 4B, and 4C illustrate an exemplary operation image of the digital signage system.

The operation image of the digital signage system 1 is illustrated in FIGS. 4A-6C. FIGS. 4A-4C illustrate exemplary operation image in a case where the pedestrian walks alone. In the case where the pedestrian walks alone as illustrated in FIGS. 4A-4C, the detection sensor 10 installed in the floor 104, on which the pedestrian 200 walks, detects the motion of the pedestrian 200, and the pedestrian information is input from the detection sensor 10 to the control apparatus 20.

As illustrated in FIG. 4A, the control apparatus 20 commands the projection apparatus 30 on the left side based on the pedestrian information received from the detection sensor 10. Then, the projection apparatus 30 on the left side displays "A" as the image 300 at, for example, a diagonally forward position of the pedestrian 200. In association with the walk of the pedestrian 200, "A" moves in the same direction as the movement of the pedestrian 200 and is continuously displayed for a predetermined time.

Figure 4B:
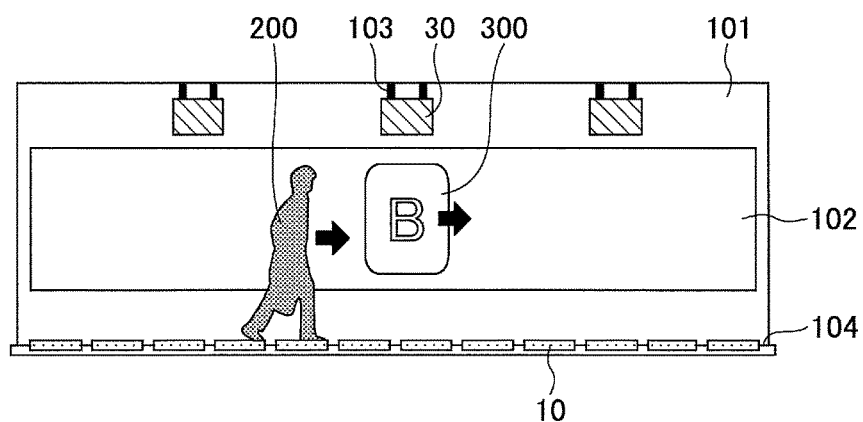

As illustrated in FIG. 4B, when the pedestrian 200 further moves in the direction of an arrow, the control apparatus 20 commands the projection apparatus 30 at the center based on the pedestrian information received from the detection sensor 10. Then, the projection apparatus 30 at the center displays "B" as the image 300 at, for example, the diagonally forward position of the pedestrian 200. In association with the walk of the pedestrian 200, "B" moves in the same direction as the movement of the pedestrian 200 and is continuously displayed for a predetermined time.

Figure 4C:
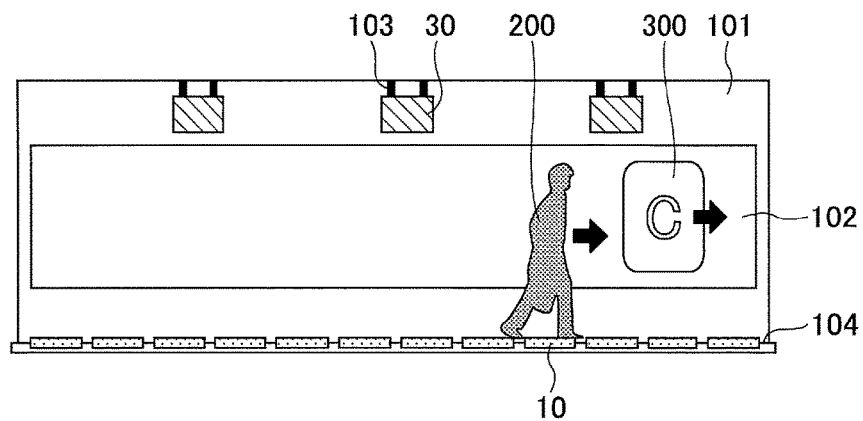

As illustrated in FIG. 4C, when the pedestrian 200 further moves in the direction of the arrow, the control apparatus 20 commands the projection apparatus 30 on the right side based on the pedestrian information received from the detection sensor 10. Then, the projection apparatus 30 on the right side displays "C" as the image 300 at, for example, the diagonally forward position of the pedestrian 200. In association with the walk of the pedestrian 200, "C" moves in the same direction as the movement of the pedestrian 200 and is continuously displayed for a predetermined time.

Figure 5:
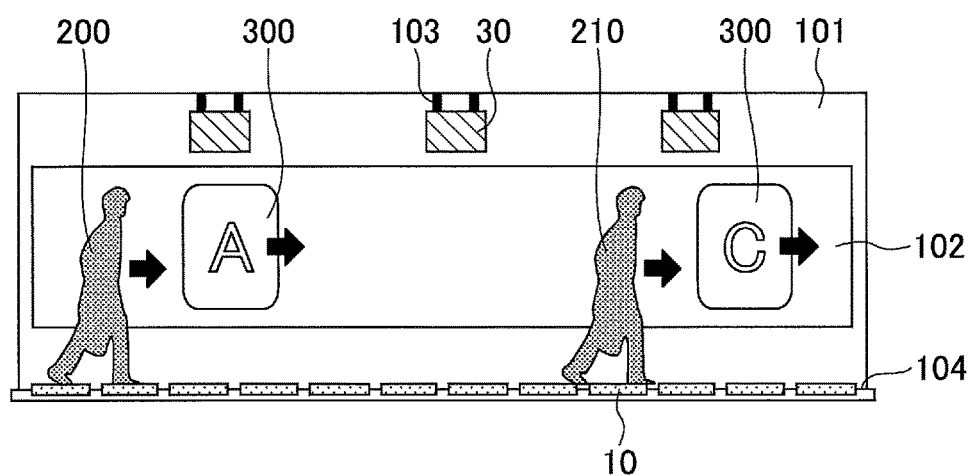
FIG. 5 illustrates another exemplary operation image of the digital signage system.

FIG. 5 illustrates an operation image in a case where multiple pedestrians (here, pedestrians 200 and 210) continuously pass through in the same direction. In the case where the multiple pedestrians continuously move as illustrated in FIG. 5, the detection sensor 10 installed in the floor 104, on which the pedestrian 200 walks, detects the motion of the pedestrian 200, and the pedestrian information is input from the detection sensor 10 to the control apparatus 20. Simultaneously, the detection sensor 10 installed in the floor 104, on which the pedestrian 210 walks, detects the motion of the pedestrian 210, and the pedestrian information received from the detection sensor 10 is input into the control apparatus 20.

The control apparatus 20 commands the projection apparatus 30 based on the pedestrian information received from the detection sensor 10 installed in the floor 104, on which the pedestrian 200 walks. Then, the projection apparatus 30 on the left side displays "A" as the image 300 at, for example, a diagonally forward position of the pedestrian 200. In association with the walk of the pedestrian 200, "A" moves in the same direction as the movement of the pedestrian 200 and is continuously displayed for a predetermined time.

Simultaneously, the control apparatus 20 commands the projection apparatus 30 based on the pedestrian information received from the detection sensor 10 installed in the floor 104, on which the pedestrian 210 walks. Then, the projection apparatus 30 on the right side displays "C" as the image 300 at, for example, the diagonally forward position of the pedestrian 210. In association with the walk of the pedestrian 200, "C" moves in the same direction as the movement of the pedestrian 200 and is continuously displayed for a predetermined time.

Figure 6A:
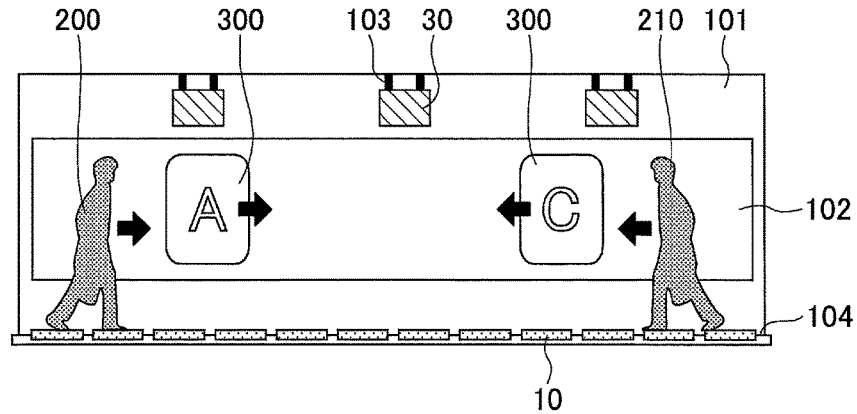
FIGS. 6A, 6B, and 6C illustrate another exemplary operation image of the digital signage system.
Figure 6B:
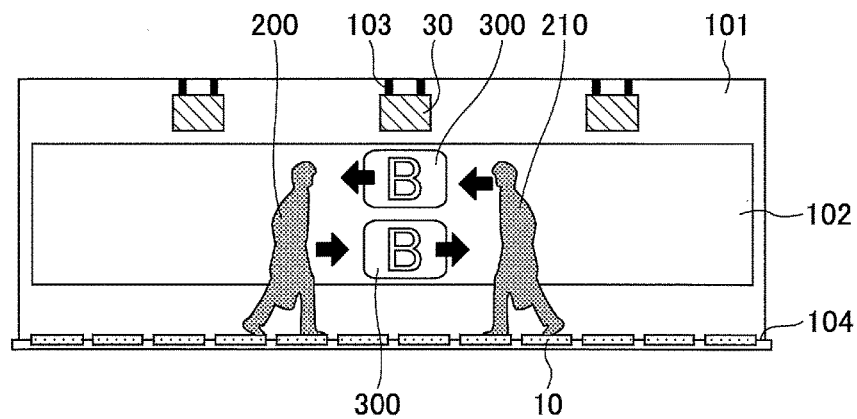
Figure 6C:
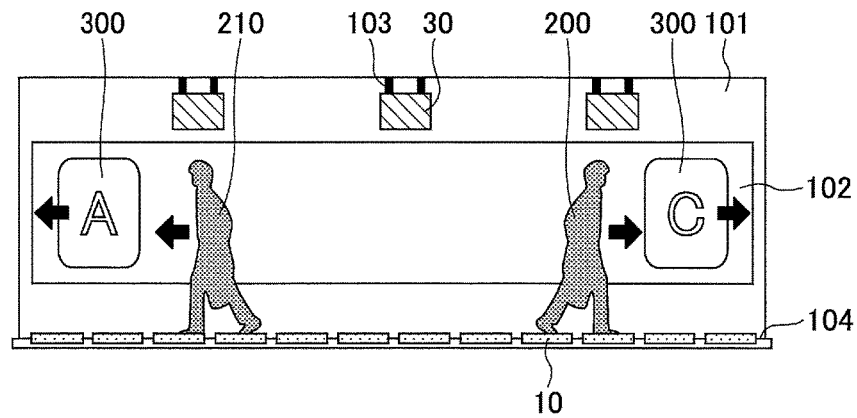

FIGS. 6A-6C illustrates an operation image in a case where multiple pedestrians (here, pedestrians 200 and 210) continuously pass through in the same direction. In the case where the multiple pedestrians continuously move as illustrated in FIGS. 6A-6C, the detection sensor 10 installed in the floor 104, on which the pedestrian 200 walks, detects the motion of the pedestrian 200, and the pedestrian information is input from the detection sensor 10 to the control apparatus 20. Simultaneously, the detection sensor 10 installed in the floor 104, on which the pedestrian 210 walks, detects the motion of the pedestrian 210, and the pedestrian information received from the detection sensor 10 is input into the control apparatus 20.

The control apparatus 20 commands the projection apparatus 30 based on the pedestrian information received from the detection sensor 10 installed in the floor 104, on which the pedestrian 200 walks. Then, the projection apparatus 30 on the left side displays "A" as the image 300 at, for example, a diagonally forward position of the pedestrian 200. In association with the walk of the pedestrian 200, "A" moves in the same direction as the movement of the pedestrian 200 and is continuously displayed for a predetermined time.

Simultaneously, the control apparatus 20 commands the projection apparatus 30 based on the pedestrian information received from the detection sensor 10 installed in the floor 104, on which the pedestrian 210 walks. Then, the projection apparatus 30 on the right side displays "C" as the image 300 at, for example, the diagonally forward position of the pedestrian 210. In association with the walk of the pedestrian 210, "C" moves in the same direction as the movement of the pedestrian 210 and is continuously displayed for a predetermined time.

As illustrated in FIG. 6B, when the pedestrians 200 and 210 further move respectively in the directions of arrows, the control apparatus 20 commands the projection apparatus 30 at the center based on the pedestrian information received from the detection sensor 10 installed in the floor, on which the pedestrian 200 walks. Then, the projection apparatus 30 on the center displays "B" as the image 300 at, for example, the diagonally forward position of the pedestrian 200. In association with the walk of the pedestrian 200, "B" moves in the same direction as the movement of the pedestrian 200 and is continuously displayed for a predetermined time.

Simultaneously, the control apparatus 20 commands the projection apparatus 30 based on the pedestrian information received from the detection sensor 10 installed in the floor 104, on which the pedestrian 210 walks. Then, the projection apparatus 30 on the center displays "B" as the image 300 at, for example, the diagonally forward position of the pedestrian 210. In association with the walk of the pedestrian 210, "B" moves in the same direction as the movement of the pedestrian 210 and is continuously displayed for a predetermined time.

As illustrated in FIG. 6C, when the pedestrians 200 and 210 further move respectively in the directions of arrows after the pedestrians 200 and 210 pass each other, the control apparatus 20 commands the projection apparatus 30 on the right side based on the pedestrian information received from the detection sensor 10. Then, the projection apparatus 30 on the right side displays "C" as the image 300 at, for example, the diagonally forward position of the pedestrian 200. In association with the walk of the pedestrian 200, "C" moves in the same direction as the movement of the pedestrian 200 and is continuously displayed for a predetermined time.

Simultaneously, the control apparatus 20 commands the projection apparatus 30 based on the pedestrian information received from the detection sensor 10 installed in the floor 104, on which the pedestrian 210 walks. Then, the projection apparatus 30 on the left side displays "A" as the image 300 at, for example, a diagonally forward position of the pedestrian 210. In association with the walk of the pedestrian 210, "A" moves in the same direction as the movement of the pedestrian 210 and is continuously displayed for a predetermined time.

Although the number of the projection apparatuses 30 is three in FIGS. 4A-6C, the number of the projection apparatuses 30 is not limited. For example, a bigger screen may be structured by further increasing the number. A wider range may be projected by fewer projection apparatuses 30.

Referring to FIGS. 4A-6C, the installation locations of the projection apparatuses 30 are portions of the wall 101 above the pedestrian 200. However, the installation locations of the projection apparatuses 30 may be portions of the wall 101 below or beside (in the vicinity of the center in the up and down directions).

Referring to FIGS. 4A-6C, the place where the image 300 is projected is the projection face 102 (the screen). However, the image 300 may be projected onto something other than the projection face (the screen). For example, the image 300 may be projected onto the detection sensor 10.

Figure 7A:
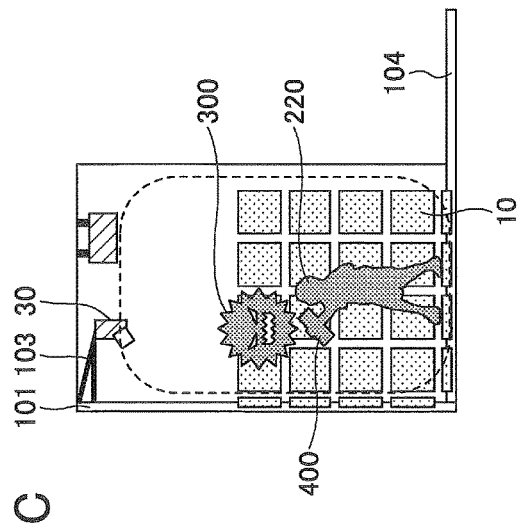
FIGS. 7A, 7B, and 7C illustrate an exemplary projection of an image onto a detection sensor.
Figure 7B:
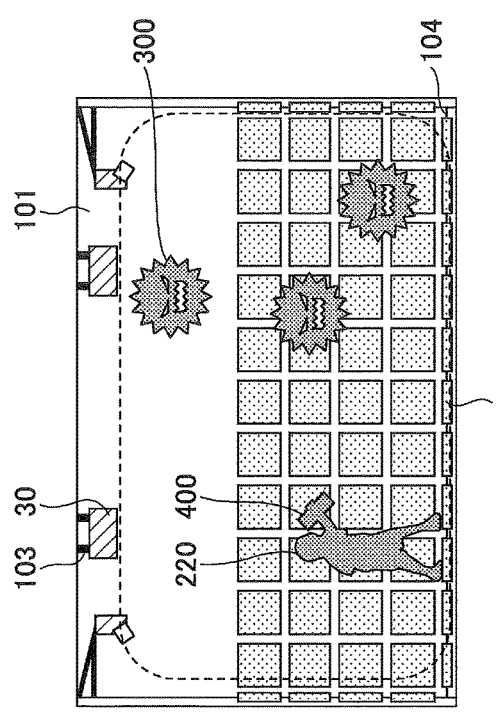
Figure 7C:
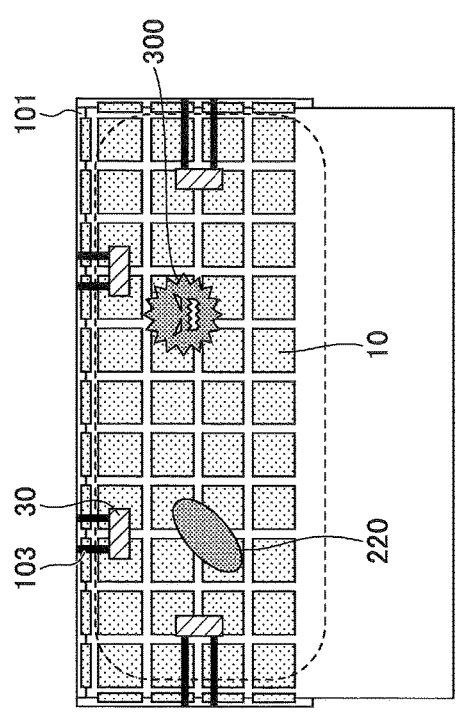

FIGS. 7A-7C illustrate an exemplary case where the image is projected onto the detection sensor. FIG. 7A is a front view, FIG. 7B is a plan view, and FIG. 7C is a side view.

Referring to FIGS. 7A-7C, a predetermined character is displayed as the image 300 for a child 220. For example, the child 220 can joyfully play if it is provided that the image 300 (a character) moves when the child 220 uses a tool so that the tool 400 touches the image 300 displayed on the predetermined process. As described, a further interactive system is substantialized when the image 300 is projected onto the detection sensor 10.

FIGS. 7A-7C are different from FIGS. 3A-C at points where multiple transducers are arranged as the detection sensors 10 not only on the floor 104 but also on the wall 101. Although the detection sensors 10 are installed in the three faces of the wall 101 in FIGS. 7A-7C, it is possible to appropriately determine the face of the wall 101, in which the detection sensors 10 are to be installed. Alternatively, the detection sensors 10 may be installed in any one of the wall 101 and the floor 104.

Referring to FIGS. 3A-3C, the shape of the detection sensors 10 is long and thin. Referring to FIGS. 7A-7C, the shape of the detection sensors 10 is substantially square, and more detection sensors 10 are installed per the same area. With this, a display of the screen 300 can be switched over in association with a smaller motion of the child 220.

Here, various structural portions of the digital signage system 1 are described in more detail.

[Transducer]

Figure 8A:
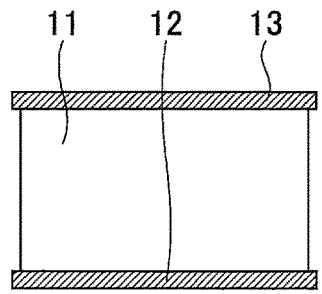
FIGS. 8A, 8B, and 8C illustrate an exemplary structure of a transducer.
Figure 8B:
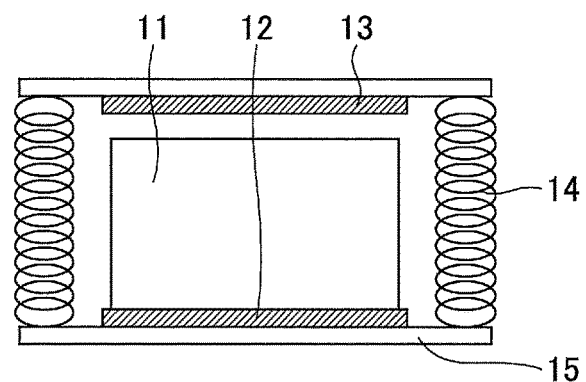
Figure 8C:
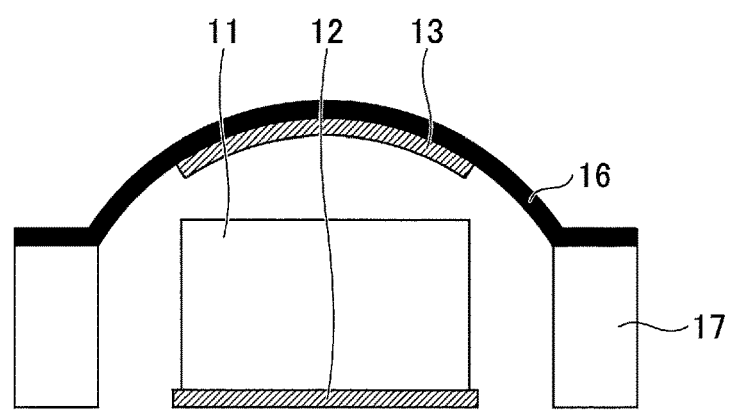

FIGS. 8A-8C illustrate the structure of the transducer used as the detection sensor 10. FIGS. 8A-8C illustrate an exemplary structure of the transducer. The structure of the transducer is not limited to FIGS. 8A-8C.

Referring to FIG. 8A, a basic form in which an intermediate layer 11 is interposed between the first electrode 12 and the second electrode 13, is illustrated. Referring to FIG. 8B, a space is provided between the intermediate layer 11 and the second electrode 13 using a coil spring 14 and a support pedestal 15. This structure contributes an improvement on an electric-generating capacity. Referring to FIG. 8C, a leaf spring and a support pedestal 17 are used instead of the coil spring 14 and the support pedestal 15. The structure illustrated in FIG. 8C can improve the durability more than the structure illustrated in FIG. 8B.

Described in detail below is the intermediate layer 11, the first electrode 12, and the second electrode 13 of the transducer.

<First Electrode 12, Second Electrode 13>

The materials, the shapes, the sizes, and the structures of the first electrode 12 and the second electrode 13 are not specifically limited and can be appropriately selected depending on a purpose. The materials, the shapes, the sizes, and the structures of the first electrode 12 and the second electrode 13 may be the same or different. However, the materials, the shapes, the sizes, and the structures of the first electrode 12 and the second electrode 13 are preferably the same.

The material of the first electrode 12 and the second electrode 13 is, for example, a metal, a carbon-based conductive material, a conductive rubber composition, or the like.

Here, the metal includes, for example, gold, silver, copper, aluminum, stainless steel, tantalum, and nickel. The carbon-based conductive material includes, for example, a carbon nanotube.

The conductive rubber composition includes, for example, a conductive filler and a composition containing rubber.

The conductive filler contained in the conductive rubber composition is, for example, a carbon material (for example, ketjenblack, acetylene black, black lead, carbon fiber (CF), carbon nanofiber (CNF), carbon nanotube (CNT), and so on), a metallic filler (gold, silver, platinum, copper, aluminum, and so on), a conductive high-polymer material (a derivative of polythiophene, polyacetylene, polyaniline, polypyrrole, poly-p-phenylene, and poly-p-phenylenevinylene or the derivative added with a dopant such as an anion and a cation), an ionic liquid, or the like.

The rubber contained in the conductive rubber composition is, for example, silicone rubber, modified silicone rubber, acrylic rubber, chloroprene rubber, polysulfide rubber, urethane rubber, isobutyl rubber, fluoro silicone rubber, ethylene rubber, natural rubber (latex), or the like.

The shapes of the first electrode 12 and the second electrode 13 are, for example, a thin film. The structures of the first electrode 12 and the second electrode 13 are, for example, a non-woven fabric in which fiber-like carbon materials pile.

<Intermediate Layer 11>

The intermediate layer 11 may be any as long as a voltage is generated when a load of a pressure is applied. It is preferable that the intermediate layer 11 has flexibility. The intermediate layer 11 having flexibility preferably satisfies at least one of the following conditions (1) and (2).

Condition (1): when the intermediate layer 11 is pressurized in a direction perpendicular to the surface of intermediate layer 11, the deformation amount of the intermediate layer 11 on the side of the first electrode 12 is different from the deformation amount of the intermediate layer 11 on the side of the second electrode 13.

Condition 2: the universal hardness (H1) at a time of pressurizing the intermediate layer 11 to retract by 10 µm on the side of the first electrode 12 is different from the universal hardness (H2) at a time of pressurizing the intermediate layer 11 to retract by 10 µm on the side of the second electrode 13.

As described, a great electric-generating capacity is obtainable by the different deformation amounts or the different hardness on both surfaces of the intermediate layer 11. The deformation amount is the maximum pressurized retraction depth of an indenter when the intermediate layer 11 is pressurized in the following conditions.

[Measurement Condition]

Measuring instrument: Instrument for measuring microhardness WIN-HUD manufactured by Fischer Instruments K.K.

Indenter: Quadrangular pyramid diamond indenter having a facing angle of 136°

Initial load: 0.02 mN

Maximum load: 1 mN

Load increment time from initial load to maximum load: 10 seconds

The universal hardness can be obtained by the following method.

[Measurement Condition]

Measuring instrument: Instrument for measuring microhardness WIN-HUD manufactured by Fischer Instruments K.K.

Indenter: Quadrangular pyramid diamond indenter having a facing angle of 136°

Pressurized retraction depth: 10 µm

Initial load: 0.02 mN

Maximum load: 100 mN

Load increment time from initial load to maximum load: 50 seconds

The ratio (H1/H2) between the universal hardness (H1) and the universal hardness (H2) is preferably equal to or greater than 1.01, more preferably equal to or greater than 1.07, and especially preferably equal to or greater than 1.13. The upper limit value of the ratio (H1/H2) is not specifically limited. The upper limit value of the ratio (H1/H2) is appropriately selected by a degree of a flexibility required by a usage state, a load in the usage state, or the like, and is preferably equal to or greater than 1.70. Here, H1 is the universal hardness of a relatively harder surface, and H2 is the universal hardness of a relatively softer surface.

The material of the intermediate layer 11 is not specifically limited and can be appropriately selected depending on an objective. For example, silicone rubber, fluoro silicone rubber, acrylic rubber, chloroprene rubber, natural rubber (latex), urethane rubber, fluorine-contained rubber, ethylene-propylene rubber, or the like is mentioned. Among these, silicone rubber is preferable.

The intermediate layer 11 may contain a filler to give various functionalities. The filler includes, for example, titanium oxide, barium titanate, lead zirconium titanate, zinc oxide, silica, calcium carbonate, carbon black, carbon nanotube, carbon fiber, iron oxide, PTFE, mica, clay mineral, synthetic hydrotalcite, and a metal. In a case where a filler having piezoelectricity or a polarized high molecule (a base material or a filler) is used, it is preferable to provide a polarization treatment.

The average thickness of the intermediate layer 11 is not specifically limited and can be appropriately selected depending on a purpose. From a point of view of a deformation following capability, the average thickness of the intermediate layer 11 is preferably 1 μm to 10 mm, more preferably 50 μm to 200 μm. If the average thickness is within a preferable range, the film formation capability is ensured and the deformation is not prevented so as to enable good electric generation.

The intermediate layer 11 is preferably insulative. The insulative property is preferably a volume resistivity equal to or greater than $10^8$ Ωcm, more preferably a volume resistivity equal to or greater than $10^{10}$ Ωcm. The intermediate layer 11 may be a multi-layer structure.

«Surface Modification Process, and Inactivation Process»

As a method of differentiating the deformation amounts or the hardness of the both surfaces of the intermediate layer 11, there are, for example, a surface modification process, an inactivation process, and so on. Both or one of the surface modification process and the inactivation process may be performed.

<Surface Modification Process>

The surface modification process is, for example, a plasma process, a corona discharge process, an electron beam irradiation process, an ultraviolet ray irradiation process, an ozonation process, a radiant ray irradiation process of irradiating an X-ray, an alpha-ray, a beta-ray, a gamma-ray, or a neutron ray, or the like. From a point of a processing speed, the plasma process, the corona discharge process, and the electron beam irradiation process are preferable among these processes. The processes are not limited to these as long as the material can be reformed.

«Plasma Process»

In a case where the plasma process is performed, a plasma generation apparatus is, for example, a parallel plate type, a capacitive coupling type, or an inductive coupling. Meanwhile, the plasma generation apparatus may be an atmospheric plasma apparatus. From a point of view of durability, a low-pressure plasma spraying is preferable.

The reaction pressure in the plasma process is not specifically limited and can be arbitrarily selected depending on the objective. The reaction pressure is preferably 0.05 Pa to 100 Pa, more preferably 1 Pa to 20 Pa.

A reaction atmosphere in the plasma process is not specifically limited and can be appropriately selected depending on the objective. The reaction atmosphere is effective when an inactive gas, a rare gas, an oxygen gas, or another gas are used, for example. An argon gas is preferable in view of continuousness of an effect. At this time, an oxygen partial pressure is preferably equal to or smaller than 5,000 ppm. When the oxygen partial pressure in the reaction atmosphere is equal to or smaller than 5,000 ppm, ozone can be prevented from being produced. Therefore, a use of an ozone process apparatus can be prevented.

The irradiation electric energy in the plasma process is determined by (output×irradiation time). The irradiation electric energy is preferably 5 Wh to 200 Wh, more preferably 10 Wh to 50 Wh. When the irradiation electric energy is within a preferable range, it is possible to provide an electric generation function to the intermediate layer 11 and prevent the durability from being degraded by excessive irradiation.

«Corona Discharge Process»

An applied energy (an integration energy) in a corona discharge process is preferably 6 J/cm² to 300 J/cm², more preferably 12 J/cm² to 60 J/cm². When the applied energy is within a preferable range, it is possible to provide an electric generation function to the intermediate layer 11 and prevent the durability from being degraded by excessive irradiation.

«Electron Beam Irradiation Process»

The irradiation amount in the electron beam irradiation is preferably equal to or greater than 1 kGy, more preferably 300 kGy to 10 MGy. When the irradiation amount is within a preferable range, it is possible to provide an electric generation function to the intermediate layer 11 and prevent the durability from being degraded by excessive irradiation.

An irradiation atmosphere in the electron beam irradiation process is not specifically limited and can be appropriately selected depending on the objective. The irradiation atmosphere is preferably formed by filling with an inactive gas of argon, neon, helium, nitrogen, or the like and making the oxygen partial pressure equal to or smaller than 5,000 ppm. When the oxygen partial pressure in the irradiation atmosphere is equal to or smaller than 5,000 ppm, ozone can be prevented from being produced. Therefore, a use of the ozone process apparatus can be prevented.

«Ultraviolet Ray Irradiation Process»

The wavelength of the ultraviolet rays used in the ultraviolet ray irradiation process is preferably equal to or greater than 200 nm and equal to or smaller than 365 nm, more preferably equal to or greater than 240 nm and equal to or smaller than 325 nm.

The accumulation light amount in the ultraviolet ray irradiation process is preferably 5 J/cm² to 500 J/cm², more preferably 50 J/cm² to 400 J/cm². When the accumulation light amount is within a preferable range, it is possible to provide an electric generation function to the intermediate layer 11 and prevent the durability from being degraded by excessive irradiation.

An irradiation atmosphere in the ultraviolet ray irradiation process is not specifically limited and can be appropriately selected depending on the objective. The irradiation atmosphere is preferably formed by filling with an inactive gas of argon, neon, helium, nitrogen, or the like and making the oxygen partial pressure equal to or smaller than 5,000 ppm. When the oxygen partial pressure in the irradiation atmosphere is equal to or smaller than 5,000 ppm, ozone can be prevented from being produced. Therefore, a use of the ozone process apparatus can be prevented.

It is proposed by the conventional technique that an active group is formed by exciting or oxidizing using a plasma process, a corona discharge process, an electron beam irradiation process, or the like so as to increase an interlayer adhesion force. However, this technique is limitedly applied to the interlayer and is not preferable to apply to the uppermost layer because mold release characteristics are degraded. Further, the reaction is performed in a condition where oxygen is rich so as to effectively introduce a reaction active group (hydroxyl). As described above, the conventional technique is essentially different from the surface modification process of the embodiment.

Because the surface modification process of the embodiment is performed in an reaction environment where there is few oxygen and the pressure is reduced (for example, a plasma process), re-crosslink and bond of the surface are promoted. Therefore, durability is improved due to "increase of Si—O bond having a high binding energy". Furthermore, mold release characteristics are supposed to be improved due to "densification caused by an improved crosslink concentration" (Although an active group is partly formed in the embodiment, the active group is inactivated by a coupling agent or an air-dry process, which is described later).

<Inactivation Process>

The surface of the intermediate layer 11 may be appropriately provided with an inactivation process using various materials. The inactivation process is not specifically limited as long as the surface of the intermediate layer 11 is inactivated and can be appropriately selected depending on the objective. For example, the inactivation process may be a process of applying an inactivation agent onto the surface of the intermediate layer 11.

The inactivation causes an active group (e.g., —OH) produced by excitation or oxidation due to a predetermined process to react with an inactive agent to reduce an activation level of the surface of the intermediate layer 11 so that the characteristics of the surface of the intermediate layer 11 are changed not to be apt to occur a chemical reaction. Here, the predetermined process is, for example, a plasma process, a corona discharge process, a UV irradiation process, or an electron beam irradiation process.

The inactive agent is, for example, an amorphous resin, a coupling agent, or the like. The amorphous resin is, for example, a resin having perfluoropolyetherether as the main chain. The coupling agent is, for example, metal alkoxide or a liquid solution containing metal alkoxide. The metal alkoxide is a chemical compound indicated by the following general expression (1), a partially-hydrolyzed polycondensation product thereof having a degree of polymerization of about 2 to 10, and a mixture of these.

R$^1_{(4-n)}$Si(OR$^2$)$_n$     General expression (1)

Here, in the general expression (1), R$^1$ and R$^2$ respectively and independently represent any one of an alkyl group shaped like a straight chain or a branched-chain having a carbon number of 1 to 10, an alkyl polyetherether chain thereof, and an aryl group thereof. Further, n represents an integer between 2 to 4.

The chemical compound represented by the general expression (1) is specifically dimethyldimethoxysilane, diethyldiethoxysilane, diethyldimethoxysilane, diethyldiethoxysilane, diphenyldimethoxysilane, diphenyldiethoxysilane, methyltrimethoxysilane, methyltriethoxysilane, tetramethoxysilane, tetraethoxysilane, or tetrapropoxysilane, for example. Especially preferable for the durability is tetraethoxysilane.

In the general expression (1), R$^1$ may be a fluoroalkyl group, fluoroalkylacrylate, or etherperfluoropolyether. R1 is preferably perfluoropolyether in view of flexibility and durability.

Further, metal alkoxide is, for example, a vinylsilane class, e.g., vinyltris(β-methoxyethoxy)silane, vinyltriethoxy silane, or vinyltrimethoxysilane), an acrylic silane class (e.g., γ-methacryloxypropyltrimethoxysilane), an epoxysilane class (e.g., β-(3,4-epoxysyslohexyl)ethyltrimethoxysilane, γ-glycidoxypropyltrimethoxysilane, or γ-glycidoxypropylmethyldietoxysilane), an amino silane class (N-β (aminoethyl)γ-aminopropyltrimethoxysilane, N-β (aminoethyl)γ-aminopropylmethyldimethoxysilane, γ-aminopropyltriethoxysilane, or N-phenylγ-aminopropylt-rimethoxysilane), or the like.

Further, the metal alkoxide may be formed by one or a mixture of Ti, Sn, Al, and Zr, as a metallic atom, other than Si.

The inactivation process can be performed by coating a surface of an intermediate precursor such as rubber with an inactive agent or causing the surface of the intermediate precursor to be impregnated into the inactive agent by dipping after a surface modification process for the intermediate precursor. In a case where silicone rubber is used as the intermediate precursor, the intermediate precursor may be statically placed in the air so as to be air-dried to deactivate.

A profile of an oxygen concentration in a thickness direction of the intermediate layer 11 preferably shows a local maximum value.

A profile of a carbon concentration in the thickness direction of the intermediate layer 11 preferably shows a local minimum value.

It is more preferable that a position corresponding to the local maximum value of the oxygen concentration matches a position corresponding to the local minimum value of the carbon concentration.

The profile of the oxygen concentration and the profile of the carbon concentration may be acquired by an X-ray photoelectron spectroscopy (XPS). The measurement method is, for example, as follows.

[Measurement Method]

Measurement device: Ulvac-PHI QuanteraSXM manufactured by ULVAC-PHI Inc.

Measurement light source: Al (mono)

Measurement output: 100 μmφ, 25.1 W

Measurement area: 500 μm×300 μm

Path energy: 55 eV (narrow scan)

Energy step: 0.1 eV (narrow scan)

Relative sensitivity coefficient: using a relative sensitivity coefficient of PHI Sputtering source: C60 cluster ion Ion gun output: 10 kV, 10 nA Raster control: (X=0.5, Y=2.0) mm Sputtering rate: 0.9 nm/min (SiO$_2$ conversion)

In the XPS, an existing concentration ratio and a binding state of an atom in a measurement target can be known by catching an electron flying out by a photoelectron effect.

Figure 9B:
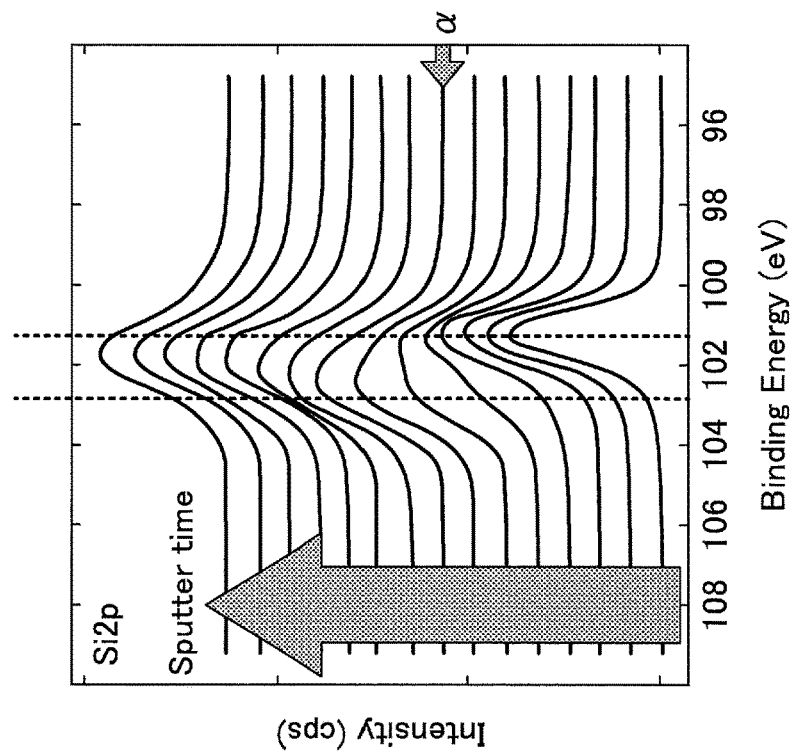
FIGS. 9A and 9B illustrate exemplary measurement data of an intermediate layer provided with a surface modification process and an inactivation process.
Figure 9A:
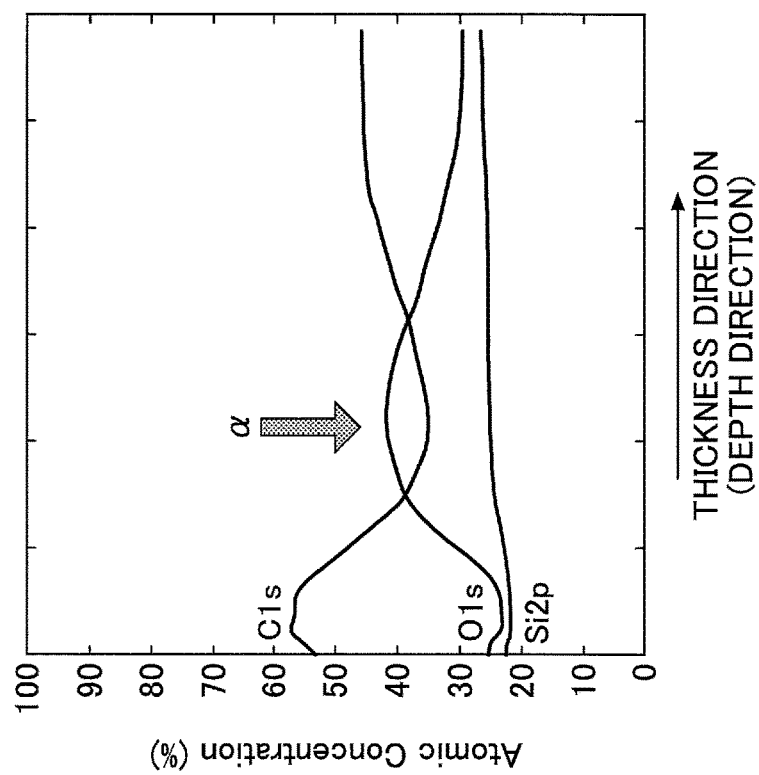

The silicone rubber has a siloxane bond. The major ingredient of the silicone rubber is Si, O, and C. Therefore, in a case where silicone rubber is used as the material of the intermediate layer 11, a wide scan spectrum of XPS is measured to enable the existing concentration ratio (atomic %) in the depth direction of each atom (Si, O, and C) existing inside the surface layer to acquire using a relative peak intensity ratio of each element. FIG. 9A illustrates this example. FIG. 9A illustrates a sample of the intermediate layer 11 acquired by using silicone rubber and providing the surface modification process (the plasma process) and an inactivation process. Regarding FIG. 9A, the abscissa designates an analysis depth in the internal direction from the surface, and the ordinate designates the existing concentration ratio.

Further, in the case of the silicone rubber, it is possible to know an element bound to silicon and a binding state thereof can be known by measuring the energy by which an electron of Si in the 2p orbit flies out. A peak separation is performed for a narrow scan spectrum, which indicates a binding state of Si in the Si2p orbit, so as to acquire the binding state. FIG. 9B illustrates the result of the acquired binding state. The measurement target illustrated in FIG. 9B is a sample used for the measurement illustrated in FIG. 9A. Referring to FIG. 9B, the abscissa designates the binding energy and the ordinate designates the intensity ratio. From the bottom to the top, the measurement spectrums are illustrated in the depth direction.

Ordinarily, it is known that the amount of the peak shift depends on the binding state. In a case of silicon rubber related to the embodiment, a shift of the peak on the side of a high energy in the Si2p orbit indicates that the number of oxygens bound to Si increases.

With this, when the surface modification process and the inactivation process are provided to the silicone rubber, oxygens increase from the surface layer to the inside so as to have the local maximum value and carbons decrease so as to have the local minimum value. It is known as a result of the analysis in the depth direction that oxygens decrease and carbons increase so as to show an atom existence concentration substantially similar to that of unprocessed silicone rubber.

Further, the local maximum value detected at α in reference of FIG. 9A matches the shift (α of FIG. 9B) of the Si2p binding energy at a higher energy side. This shows that the increase of oxygen is caused by the number of oxygens bound to Si.

FIGS. 10A and 10B illustrate results in unprocessed silicone rubber of analysis similar to the above.

Referring to FIG. 10A, a local maximum value of the oxygen concentration and a local minimum value of the carbon concentration do not exist unlike FIG. 9A. Further, referring to FIG. 10B, no shift in the Si2p binding energy onto the higher energy side is observed. Therefore, it is confirmed that the number of oxygens bound to Si does not change.

As described, by coating the surface of the intermediate layer 11 with an inactive agent such as a coupling agent or dipping the intermediate layer 11 into the inactive agent to permeate, the inactive agent is impregnated into the intermediate layer 11. In a case where the coupling agent is a chemical compound expressed by the general expression (1), polyorganosiloxane exists with a concentration distribution in the intermediate layer 11. This distribution shows a local maximum value in the depth direction of oxygen atoms contained in polyorganosiloxane. As a result, the intermediate layer 11 contains polyorganosiloxane having a silicon atom bound to three or four oxygen atoms.

The inactivation process is not limited to a dipping method. For example, it is sufficient that the distribution of the oxygen atoms contained in polyorganosiloxane has a local maximum value in the depth direction (the thickness direction). The inactivation process may be a plasma CVD, PVD, sputtering, combustion chemical vapor deposition, or the like.

The intermediate layer 11 needs not to have an initial surface potential in a statically placed state. The initial surface potential in the statically placed state can be measured under the following measurement condition. Here, an issue that there is no initial surface potential indicates a voltage within ±10 V at a time of measuring under the following measurement condition.

[Measurement Condition]

Preprocessing: after statically placing for 24 hours in an atmosphere of a temperature of 30° C. and a humidity of 40 wet %, electricity is removed for 60 seconds (using SJ-F300 manufactured by Keyence corporation)

Device: Treck Model344
Measurement probe: 6000B-7C
Measurement distance: 2 mm
Measurement spot diameter: diameter (φ) 10 mm At this point, the transducer of the embodiment has a principal of electric power generation different from technique described in Japanese Laid-Open Patent Publication No. 2009-253050, Japanese Laid-Open Patent Publication No. 2014-027756, Japanese Laid-Open Patent Publication No. S54-14696, and so on.

In the transducer of the embodiment, a bias is generated in an electrostatic capacity. This bias is generated due to a difference of a deformation amount based on a hardness difference between both surfaces of the deformation amount by static electrification caused by a mechanism resembling to frictional electrification. This bias is further generated due to generation of a surface potential difference due to an internal electric charge reservation. Therefore, electric charges are assumed to move to generate electric power. However, the principal of this electric power generation is not accurately known.

Within the embodiment, the transducer preferably includes at least a space between the intermediate layer 11 and the first electrode 12 or between the intermediate layer 11 and the second electrode 13. As such, it is possible to increase an electric-generating capacity. A method of providing space is not specifically limited and can be appropriately selected in response to an objective. Beside the above structures illustrated in FIGS. 8A-8C, a spacer may be disposed at least between the intermediate layer 11 and the first electrode 12 or between the intermediate layer 11 and the second electrode 13.

Hereinafter, a digital signage system 1 of the embodiment is described based on an example. However, the digital signage system 1 is not limited to the following example. For example, the example described later is a case where a floor surface is sensed. However, a place where the detection sensor is formed is not limited to the floor surface.

EXAMPLE

In the example, a transducer using a piezoelectric body is used as the detection sensor 10 as described below.

[Transducer]

An electrode material of the first electrode is an aluminum sheet having a thickness of 12 μm manufactured by Mitsubishi Aluminum Co., Ltd. An intermediate layer of an polymer piezoelectric body is formed by a base material, which is formed by mixing silicone rubber with barium titanate at a ratio of a base rubber of 100 weight % and the barium titanate of 40 weight %, and plaid paint, which is provided to have a target film thickness of about 150±20 μm, a target length of 3 m, and a target width of 150 mm. Here, the silicone rubber is TSE3033 manufactured by Momentive Performance Materials Inc. Further, the barium titanate is 93-5640 manufactured by Wako Pure Chemical Industries, Ltd.

The intermediate layer is sintered for 30 minutes at a high temperature of about 120° C. Thereafter, a surface modification process is performed as a plasma process under the following condition: a device of PR-500 manufactured by YAMATO SCIENTIFIC CO., LTD.; an output of 100 W; a processing time of 4 minutes; an reaction gas of argon 99.999%; and a reaction pressure of 10 Pa.

Further, after the plasma process, a 0.1% liquid solution obtained by diluting OPTOOL DSX, which is a fluorinated carbon compound, manufactured by DAIKIN INDUSTRIES, LTD. by perfluorohexane is painted on the treated surface of the intermediate layer by dipping at a pull-up speed of 10 mm/min. Thereafter, the intermediate layer is maintained in an environment of a humidity of 90% and a temperature of 60° C. for a time equal to or longer than 30 minutes, and thereafter the intermediate layer is dried at 50° C. for ten minutes.

An aluminum sheet layer the same as the material of the first electrode overlaps an upper portion of the intermediate layer to form the second electrode. An electric wire is connected to each electrode, and the entirety is sealed with a PET film having a thickness of 50 μm. At this time, only the electric wires respectively connected to the first and second electrodes are not sealed so as to enable a voltage signal to be taken out. Further, within the example, the following digital signage system is structured.

[Digital Signage System]

As the digital signage system, a system illustrated in FIGS. 3A-3C is structured. The control apparatus 20 gathering the taken out voltage signals is a personal computer of Vostro 3800, which is manufactured by Dell Computer Corp. and in which Intel Core ("Core" is a registered trademark) i3 processor and an OS of Windows ("Windows" is a registered trademark) 8.1 are installed. The control apparatus 20 can specify a position by an input signal from the detection sensor 10 and can estimate a moving speed of a pedestrian from a time change of the former and latter input signals.

The projection apparatus 30 displaying the advertisement data is three PJ WX4141NI manufactured by Ricoh Co., Ltd. The projection apparatus 30 is fixed to an upper portion of the projection face 102 illustrated in FIG. 3. By combining images, an image long along the moving direction of the pedestrian 200 is projected. Specifically, within the example, based on a calculation performed by the control apparatus 20, the advertisement data of preset 5 patterns are switched over at every 0.5 second so as to control a position where the image is displayed, and the advertisement is moved so as to be projected by the projection apparatus 30 at a position about 30 cm ahead in the moving direction from the pedestrian.

[Evaluation]

The above digital signage system is evaluated by ten pedestrians, who are randomly selected from walking men, freely walking a walkway having a length of 6 m and a width of 2 m. The walking speeds of the walking men are indicated as in Table 1.

TABLE 1

| | WALKING SPEED |
|---|---|
| PEDESTRIAN (1) | SPEED 1: 0.2 m/sec EQUAL TO |
| PEDESTRIAN (2) | OR GREATER THAN 1.0 m/sec |
| PEDESTRIAN (3) | SMALLER THAN |
| PEDESTRIAN (4) | SPEED 2: 1.0 m/sec EQUAL TO |
| PEDESTRIAN (5) | OR GREATER THAN 1.5 m/sec |
| PEDESTRIAN (6) | SMALLER THAN |
| PEDESTRIAN (7) | SPEED 3: 1.5 m/sec EQUAL TO |
| PEDESTRIAN (8) | OR GREATER THAN 2.0 m/sec |

TABLE 1-continued

| | WALKING SPEED |
|---|---|
| PEDESTRIAN (9) | SMALLER THAN |
| PEDESTRIAN (10) | |

Each of the pedestrians previously selects the curious advertisement from among the advertisements of the five patterns. After the walk, the number of the pedestrians who could watch the corresponding curious advertisement is counted. The counted number is evaluated into 4 levels, namely level 1 of 0 to 3 persons, level 2 of 4 to 6 persons, and level 3 of 7 to 10 persons. Here, the acceptable level is level 3.

Figure 11A:
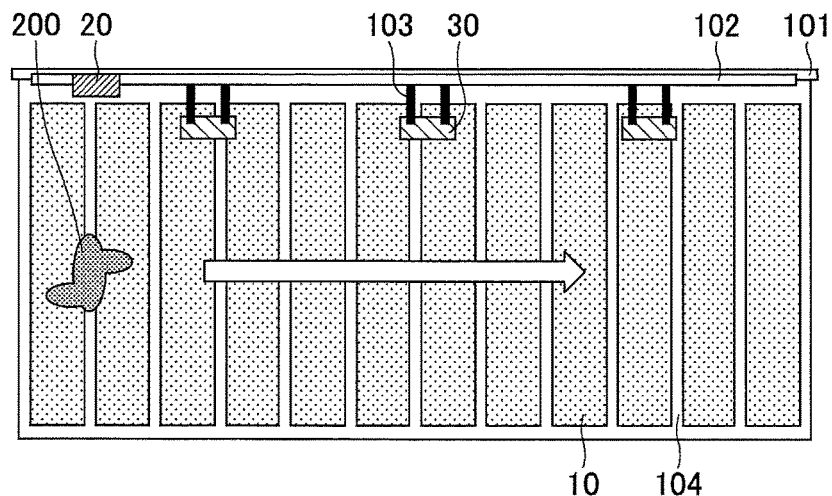
FIGS. 11A, 11B, and 11C illustrate an evaluation environment of the embodiment.
Figure 11B:
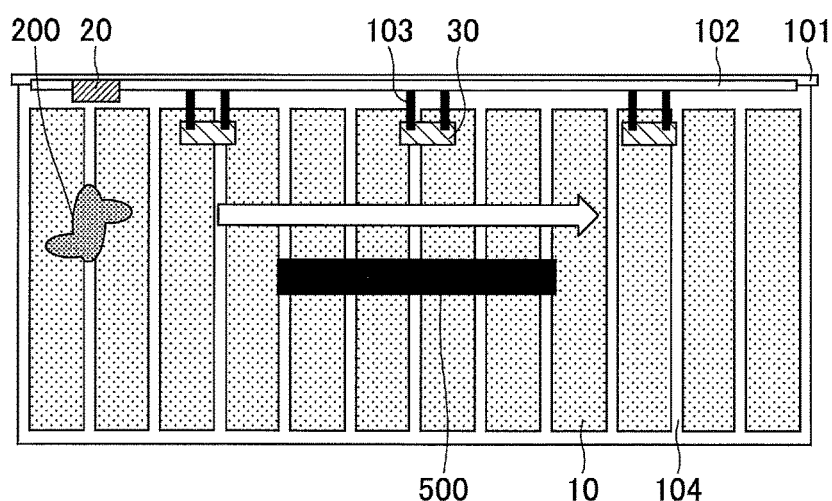
Figure 11C:
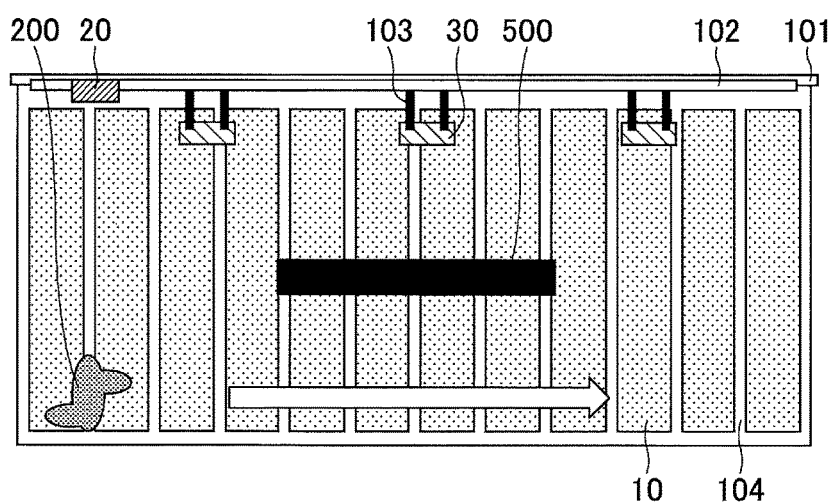

The evaluation environment includes 3 patterns indicated in Table 2 and FIGS. 11A-11C. Evaluation 1 of Table 2 and FIG. 11A indicates a state where predetermined illumination is provided to a projection face 102 in its vertical direction. Evaluation 2 of Table 2 and FIG. 11B indicates a state where, in addition to the environment of evaluation 1, an obstacle 500 is located at a position between 2 m to 4 m from a start point to form a shadow, and an area between the obstacle and the projection face 102 is walked. Evaluation 3 of Table 2 and FIG. 11C indicates a state where, in addition to the environment of evaluation 1, the obstacle 500 is located at a position between 2 m to 4 m from the start point to form the shadow, and it is walked so that the obstacle 500 is interposed relative to the projection face 102 (the obstacle 500 is interposed between the pedestrian and the projection face 102).

TABLE 2

| | EVALUATION ENVIRONMENT |
|---|---|
| EVALUATION 1 | STATE WHERE PREDETERMINED ILLUMINATION IS PROVIDED TO PROJECTION FACE IN VERTICAL DIRECTION. |
| EVALUATION 2 | IN ADDITION TO ENVIRONMENT OF EVALUATION 1, OBSTACLE IS LOCATED AT POSITION BETWEEN 2 m TO 4 m FROM START POINT TO FORM A SHADOW, AND AREA BETWEEN OBSTACLE AND PROJECTION FACE IS WALKED. |
| EVALUATION 3 | IN ADDITION TO ENVIRONMENT OF EVALUATION 1, OBSTACLE IS LOCATED AT POSITION BETWEEN 2 m TO 4 m FROM START POINT TO FORM A SHADOW, AND IT IS WALKED SO THAT OBSTACLE IS INTERPOSED RELATIVE TO PROJECTION FACE. |

Further, as a comparative example illustrated in FIGS. 12A-12C, instead of the detection sensor 10 (the transducer), a digital signage system is formed using a position sensing by a camera 150, and an evaluation similar to the example is performed. In the comparative example, the frame rate and the resolution of the camera are adjusted so that the processing load of the CPU in the control apparatus 20 is the same as the example. The image recognition method of the camera is a detection method using a contrast ratio.

[Evaluation Result]

The evaluation results are indicated in Tables 3 and 4. In Tables 3 and 4, a mark o designates "visible", and a mark x designates "invisible". As described above, the acceptable level is level 3.

TABLE 3

| EMBODIMENT | EVALUATION 1 | EVALUATION 2 | EVALUATION 3 |
|---|---|---|---|
| PEDESTRIAN (1) | ○ | ○ | ○ |
| PEDESTRIAN (2) | ○ | ○ | ○ |
| PEDESTRIAN (3) | ○ | ○ | ○ |
| PEDESTRIAN (4) | ○ | ○ | ○ |
| PEDESTRIAN (5) | ○ | ○ | ○ |
| PEDESTRIAN (6) | ○ | ○ | ○ |
| PEDESTRIAN (7) | ○ | ○ | ○ |
| PEDESTRIAN (8) | ○ | ○ | X |
| PEDESTRIAN (9) | ○ | ○ | ○ |
| PEDESTRIAN (10) | ○ | ○ | ○ |
| OVERALL DETERMINATION | LEVEL 3 | LEVEL 3 | LEVEL 3 |

TABLE 4

| COMPARATIVE EXAMPLE | EVALUATION 1 | EVALUATION 2 | EVALUATION 3 |
|---|---|---|---|
| PEDESTRIAN (1) | ○ | ○ | ○ |
| PEDESTRIAN (2) | ○ | ○ | X |
| PEDESTRIAN (3) | ○ | ○ | ○ |
| PEDESTRIAN (4) | ○ | X | X |
| PEDESTRIAN (5) | ○ | ○ | X |
| PEDESTRIAN (6) | ○ | X | X |
| PEDESTRIAN (7) | X | X | X |
| PEDESTRIAN (8) | X | X | X |
| PEDESTRIAN (9) | X | X | X |
| PEDESTRIAN (10) | X | X | X |
| OVERALL DETERMINATION | LEVEL 2 | LEVEL 2 | LEVEL 1 |

From Tables 3 and 4, the following is known. Said differently, from the result of Evaluation 1, it is known that the comparative example cannot follow persons (pedestrian (7), pedestrian (8), and pedestrian (9)) walking at a high walking speed to follow unlike the example by which these persons are followed. Therefore, according to the example, sensing is enabled to follow a faster speed than that of the comparative example.

Further, from the result of Evaluation 2, it is known that persons (pedestrian (4), pedestrian (5), and pedestrian (6)) walking at a lower walking speed occasionally have a difficulty in viewing the advertisements required to view by these persons. This is caused by an improper display of the advertisement in conformity with the moving speed of the pedestrian. This improper display is caused by an existence of the obstacle in the background of the pedestrian and an insufficient contrast ratio for the camera to recognize the pedestrian due to the obstacle. In the example, such an improper display does not occur. Resultantly, sensing with a lesser environment variation is substantialized in comparison with the comparative example.

Further, from the result of Evaluation 3, it is known that persons (pedestrian (1), pedestrian (2), and pedestrian (3)) walking at a further lower walking speed occasionally have a difficulty in viewing the advertisements required to view by these persons. This difficulty is caused by a decrease of a time for the camera to capture the pedestrian by a blind angle and therefore a time for the advertisement to follow the pedestrian is shortened in a case where the pedestrian is once hidden behind the obstacle. Within the example, one person could not view the required advertisement at a speed 3. This is physically caused by a decrease of a viewing time for the pedestrian due to the existence of the obstacle. As a result, in comparison with the comparative example, the example substantializes sensing with a fewer blind angle.

As described above, within the embodiment and the example, by using the transducer, which transforms pressure to an electrical signal, as the detection sensor, the position, the weight, and the acceleration of each pressure-sensitive position can be accurately and limitedly acquired. Therefore, the acquired information is positional information as is, and minimally limited data are analyzed. Therefore, the analysis can be conducted using a relatively light process.

Further, in addition to the highly sensitive sensing, it is possible to estimate a movement and a speed of a target person using data of weight movement and acceleration. Therefore, it is possible to follow a faster movement. Furthermore, it is a sensing condition to directly apply pressure to the detection sensor. Therefore, sensing without an environment variation can be structured.

Further, a measurement point is a "surface", and sensing without a dead angle can be realized by arranging the detection sensors to cover a wide area. As a result, a time for the pedestrian to view the advertisement increases, and therefore a highly appealing advertisement is possible.

According to the embodiment and the example, it is possible to provide a digital signage system having an improved visibility.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a digital signage system has been described in detail, it should be understood that various changes, substitutions, and alterations could be made thereto without departing from the spirit and scope of the invention.

This application is based upon and claims the benefit of priority of the prior Japanese Patent Application No. 2015-095079, filed on May 7, 2015, and the Japanese Patent Application No. 2016-012259, filed on Jan. 26, 2016, the entire contents of which are incorporated herein by reference.

What is claimed is:

1. A digital signage system comprising:
 a transducer configured to transform pressure into an electrical signal;
 a control apparatus configured to change information in association with the intensity of the electrical signal; and
 an output apparatus configured to output the information to an output target based on a command of the control apparatus, wherein
 the transducer includes
  a first electrode,
  a second electrode, and
  an intermediate layer provided between the first electrode and the second electrode, the intermediate layer
   being made from silicone rubber,
   having a front surface and a back surface that are each subjected to a surface modification process and an inactivation process, such that the amount of siloxane bonds at the front surface is different from the amount of siloxane bonds at the back surface, and
 wherein a hardness of the intermediate layer at a time of pressurizing the intermediate layer on the side of the first electrode is different from a hardness of the intermediate layer at a time of pressurizing the intermediate layer on the side of the second electrode.

2. The digital signage system according to claim 1, wherein the output target is the transducer.

3. The digital signage system according to claim 1, wherein the transducer detects a motion of an object as the pressure and outputs the converted electrical signal to the control apparatus.

4. The digital signage system according to claim 1, wherein the transducer detects a position of an object as the pressure and outputs the converted electrical signal to the control apparatus.

5. The digital signage system according to claim 1, wherein the transducer includes a plurality of transducers, and the plurality of transducers are arranged on a predetermined surface on which an object can apply the pressure.

6. The digital signage system according to claim 1, wherein a hardness ratio between a universal hardness of the front surface of the intermediate layer and a universal hardness the back surface of the intermediate layer is equal to or greater than 1.07.

* * * * *